(12) United States Patent
Einav et al.

(10) Patent No.: US 9,776,272 B2
(45) Date of Patent: Oct. 3, 2017

(54) SYSTEM AND METHOD FOR MODULAR PORTABLE WELDING AND SEAM TRACKING

(71) Applicant: Weldobot Ltd., Kadima (IL)

(72) Inventors: Omer Einav, Emek Hefer (IL); Doron Shabanov, Zur-Yigal (IL); Daniel Spirtus, Holon (IL); Ami Andre Kronenberg, Nesher (IL)

(73) Assignee: WELDOBOT LTD., Kadima (IL)

( * ) Notice: Subject to any disclaimer, the term of this patent is extended or adjusted under 35 U.S.C. 154(b) by 0 days.

(21) Appl. No.: 14/360,274

(22) PCT Filed: Nov. 7, 2012

(86) PCT No.: PCT/IB2012/002258
§ 371 (c)(1),
(2) Date: May 22, 2014

(87) PCT Pub. No.: WO2013/076541
PCT Pub. Date: May 30, 2013

(65) Prior Publication Data
US 2015/0321280 A1     Nov. 12, 2015

Related U.S. Application Data

(60) Provisional application No. 61/563,569, filed on Nov. 24, 2011.

(51) Int. Cl.
*B23K 37/00* (2006.01)
*B23K 9/02* (2006.01)
(Continued)

(52) U.S. Cl.
CPC ............... *B23K 9/02* (2013.01); *B23K 9/095* (2013.01); *B23K 31/125* (2013.01);
(Continued)

(58) Field of Classification Search
None
See application file for complete search history.

(56) References Cited

U.S. PATENT DOCUMENTS 1,981,341 A * 11/1934 Anderson ............. B23K 7/006
266/56
2,050,146 A * 8/1936 Anderson ............. B23K 7/006
266/56
(Continued)

FOREIGN PATENT DOCUMENTS

DE      102007031982 A1 * 1/2009 ............. B23K 11/25
GB          1534257 A * 11/1978 ........... B12K 9/0286
(Continued)

OTHER PUBLICATIONS

John Norrish, "Advanced Welding Processes Technologies and Process Control," Woodhead Pub. Ltd., pgs. Title pp. 203-216, 220, 227-228 (2006).

*Primary Examiner* — Kiley Stoner
(74) *Attorney, Agent, or Firm* — The Roy Gross Law Firm, LLC; Roy Gross

(57) ABSTRACT

A modular two-part welding and processing platform is described. A cart section is capable of rotating around objects such as pipes and cylinders, or of linear travel along plates or the like. This cart section reversibly couples to a processing section supplied for instance with welding apparatus, painting apparatus, cleaning means, analysis means or the like. By means of this two-part device, work pieces can be cleaned, welded, and inspected quickly and accurately. Special marks may be provided on the work piece which in conjunction with sensors and motoring means on the cart, allow for precise positioning of the process head with respect to the work.

10 Claims, 19 Drawing Sheets

(51) Int. Cl.
 *B23K 9/095*  (2006.01)
 *B23K 31/12*  (2006.01)
 *B23K 37/02*  (2006.01)
 *B23Q 17/22*  (2006.01)
 *B23Q 3/00*  (2006.01)
 *B23Q 5/02*  (2006.01)
 *B23Q 9/00*  (2006.01)

(52) U.S. Cl.
 CPC ........ *B23K 37/027* (2013.01); *B23K 37/0211*
  (2013.01); *B23K 37/0217* (2013.01); *B23K*
  *37/0276* (2013.01); *B23K 37/0282* (2013.01);
  *B23Q 3/005* (2013.01); *B23Q 5/02* (2013.01);
  *B23Q 9/0007* (2013.01); *B23Q 9/0021*
  (2013.01); *B23Q 17/2266* (2013.01)

(56) References Cited

U.S. PATENT DOCUMENTS

| | | | | | |
|---|---|---|---|---|---|
| 2,656,447 A | * | 10/1953 | Darner | ................ | B23K 9/0253 116/301 |
| 2,956,147 A | * | 10/1960 | Baker | ................ | B23K 9/0286 219/125.11 |
| 3,084,244 A | * | 4/1963 | Rieppel | ................ | B23K 9/0286 219/137 R |
| 3,135,850 A | * | 6/1964 | Scheiler | ................ | B23K 9/0286 219/60 A |
| 3,380,148 A | * | 4/1968 | Nelson | ................ | B23K 9/0286 219/61 |
| 3,515,843 A | * | 6/1970 | Nunokawa | ................ | B23K 9/0286 219/125.1 |
| 3,555,239 A | * | 1/1971 | Kerth | ................ | G05B 19/188 219/121.63 |
| 3,604,612 A | * | 9/1971 | Miller | ................ | B23K 37/0217 219/60 A |
| 3,688,615 A | * | 9/1972 | Protze | ................ | B23D 45/126 125/14 |
| 3,718,798 A | * | 2/1973 | Randolph | ................ | B23K 9/30 219/125.12 |
| 3,727,025 A | * | 4/1973 | Dibenedetto | ................ | B23K 9/0286 219/60 A |
| 3,753,525 A | * | 8/1973 | Homes | ................ | B23K 9/0286 219/59.1 |
| 3,783,223 A | * | 1/1974 | Gwin | ................ | B23K 9/30 219/60 A |
| 3,800,116 A | * | 3/1974 | Tanaka | ................ | B23K 9/0286 219/125.11 |
| 3,806,694 A | * | 4/1974 | Nelson | ................ | B23K 9/0286 219/124.31 |
| 3,840,170 A | * | 10/1974 | Arikawa | ................ | B23K 37/0217 219/125.11 |
| 3,920,946 A | * | 11/1975 | Takahashi | ................ | B23K 9/0286 219/126 |
| 3,975,003 A | * | 8/1976 | Buford | ................ | B23K 37/0276 266/56 |
| 4,010,346 A | * | 3/1977 | Cecil | ................ | B23K 37/02 219/124.34 |
| 4,144,992 A | * | 3/1979 | Omae | ................ | B23K 9/0286 219/125.11 |
| 4,145,593 A | * | 3/1979 | Merrick | ................ | B23K 9/0286 219/125.11 |
| 4,175,224 A | * | 11/1979 | Sims | ................ | B23K 37/0276 104/118 |
| 4,216,896 A | * | 8/1980 | Chang | ................ | B23K 37/0531 228/169 |
| 4,250,813 A | * | 2/1981 | Slavens | ................ | B23K 37/00 104/118 |
| 4,260,869 A | * | 4/1981 | Slavens | ................ | B23K 37/0217 104/119 |
| 4,283,044 A | * | 8/1981 | McKibbin | ................ | B23K 37/0217 266/58 |
| 4,283,617 A | * | 8/1981 | Merrick | ................ | B23K 9/0286 219/125.1 |
| 4,331,278 A | * | 5/1982 | Sherer | ................ | B23K 37/0276 219/124.31 |
| 4,336,436 A | * | 6/1982 | Dubovetsky | ................ | B23K 9/0286 219/125.11 |
| 4,373,125 A | * | 2/1983 | Kazlauskas | ................ | B23K 9/0286 219/125.11 |
| 4,378,086 A | * | 3/1983 | Wascat | ................ | B23K 31/027 228/4.1 |
| 4,392,604 A | * | 7/1983 | Sears | ................ | B23K 37/02 219/124.34 |
| 4,400,611 A | * | 8/1983 | Wilkinson | ................ | H01R 13/447 219/121.46 |
| 4,635,839 A | * | 1/1987 | Slavens | ................ | B23K 9/028 104/119 |
| 4,649,250 A | * | 3/1987 | Kazlauskas | ................ | B23K 37/0217 219/125.11 |
| 4,700,045 A | * | 10/1987 | Merry | ................ | B23Q 35/128 219/121.78 |
| 4,716,271 A | * | 12/1987 | Hulsizer | ................ | B23Q 9/0021 219/125.11 |
| 4,726,300 A | * | 2/1988 | Kazlauskas | ................ | E02D 5/285 104/118 |
| 4,757,977 A | * | 7/1988 | Krieg | ................ | B23K 37/0217 266/56 |
| 4,767,048 A | * | 8/1988 | Kimbrough | ................ | B23K 37/0217 104/165 |
| 4,806,732 A | * | 2/1989 | Abshire | ................ | B23K 9/1274 219/124.34 |
| 4,812,614 A | * | 3/1989 | Wang | ................ | B23K 9/1274 219/124.34 |
| 4,841,123 A | * | 6/1989 | Novak | ................ | B23K 37/0217 219/125.11 |
| 4,843,213 A | * | 6/1989 | Raimondi | ................ | B23K 37/02 104/118 |
| 4,918,517 A | * | 4/1990 | Burgoon | ................ | H04N 7/18 348/335 |
| 5,001,324 A | * | 3/1991 | Aiello | ................ | B23K 26/04 219/121.63 |
| 5,030,812 A | * | 7/1991 | Sugitani | ................ | B23K 9/0282 219/124.34 |
| 5,070,792 A | * | 12/1991 | Harris | ................ | B23K 37/0211 104/118 |
| 5,099,098 A | * | 3/1992 | Burgoon | ................ | B23K 9/0286 219/125.11 |
| 5,126,523 A | * | 6/1992 | Rinaldi | ................ | B23K 37/0533 219/125.11 |
| 5,227,601 A | * | 7/1993 | Black | ................ | B23K 9/12 219/124.33 |
| 5,332,143 A | * | 7/1994 | Furukawa | ................ | B23K 37/0211 219/124.31 |
| 5,443,199 A | * | 8/1995 | Krumszyn | ................ | B23K 9/0286 228/29 |
| 5,534,676 A | * | 7/1996 | Rinaldi | ................ | B23K 9/1272 219/124.34 |
| 5,660,093 A | * | 8/1997 | Ricci | ................ | B23B 5/00 82/113 |
| 5,676,857 A | * | 10/1997 | Parker | ................ | B23K 9/0286 219/125.11 |
| 5,685,996 A | * | 11/1997 | Ricci | ................ | B23B 5/163 219/121.39 |
| 5,811,055 A | * | 9/1998 | Geiger | ................ | B23K 9/0061 266/48 |
| 5,853,655 A | * | 12/1998 | Baker | ................ | B23K 5/08 228/45 |
| 5,981,906 A | * | 11/1999 | Parker | ................ | B23K 9/0286 219/137 PS |
| 6,163,003 A | * | 12/2000 | Battisti | ................ | B23K 11/0073 219/55 |
| 6,313,426 B2 | * | 11/2001 | Belloni | ................ | 219/125.11 |
| 6,365,873 B1 | * | 4/2002 | Smartt | ................ | B23K 31/125 219/130.01 |
| 6,492,618 B1 | * | 12/2002 | Flood | ................ | B23K 9/0286 219/125.11 |
| 6,696,012 B1 | | 2/2004 | Theriot | ................ | B23K 7/006 266/48 |

(56) References Cited

U.S. PATENT DOCUMENTS

| | | | | | |
|---|---|---|---|---|---|
| 6,737,601 | B1* | 5/2004 | Kramer | | B23K 9/0216 219/125.11 |
| 8,002,165 | B2* | 8/2011 | Zurbuchen | | B29C 65/02 228/102 |
| 8,714,433 | B1* | 5/2014 | Snead | | B23K 37/0217 228/101 |
| 2001/0015349 | A1* | 8/2001 | Belloni | | B23K 9/0286 219/124.34 |
| 2001/0017292 | A1* | 8/2001 | Belloni | | B23K 9/0286 219/125.11 |
| 2002/0060211 | A1* | 5/2002 | Marhofer | | B23K 9/0216 219/125.12 |
| 2003/0038156 | A1* | 2/2003 | Artelsmair | | B23K 9/1276 228/102 |
| 2003/0047585 | A1* | 3/2003 | McCombe | | B23K 9/0286 228/49.1 |
| 2004/0026390 | A1* | 2/2004 | Kondo | | B23K 9/02 219/124.34 |
| 2006/0027952 | A1* | 2/2006 | Meissner | | B23K 37/0276 266/67 |
| 2006/0087448 | A1* | 4/2006 | Den Boer | | E21B 17/006 340/854.2 |
| 2006/0163317 | A1* | 7/2006 | Wirth | | B23K 37/0217 228/32 |
| 2007/0023479 | A1* | 2/2007 | Koppert | | B23K 9/0286 228/101 |
| 2007/0119829 | A1* | 5/2007 | Vietz | | B23K 26/04 219/121.63 |
| 2007/0297556 | A1 | 12/2007 | Spencer et al. | | |
| 2010/0301103 | A1* | 12/2010 | Bonelli | | B23K 9/0216 228/227 |
| 2011/0049105 | A1* | 3/2011 | Dupont | | B23K 9/0286 219/59.1 |
| 2012/0118864 | A1* | 5/2012 | L'Arvor | | B23K 9/1278 219/124.1 |
| 2012/0201347 | A1* | 8/2012 | Prentice | | B23K 31/125 378/59 |
| 2012/0213937 | A1* | 8/2012 | Lavalley | | B26D 3/16 427/401 |
| 2013/0008548 | A1* | 1/2013 | Bowers | | B23K 37/0217 138/97 |
| 2013/0008881 | A1* | 1/2013 | Berbakov | | B23K 9/0216 219/136 |
| 2013/0126497 | A1* | 5/2013 | Miller | | F16H 35/00 219/125.11 |
| 2013/0146566 | A1* | 6/2013 | Peters | | B23K 9/04 219/61 |
| 2013/0175258 | A1* | 7/2013 | Kastelein | | B23K 5/24 219/60 A |
| 2013/0200057 | A1* | 8/2013 | Miller | | B23K 9/32 219/138 |
| 2013/0264761 | A1* | 10/2013 | Dagenais | | B23K 37/0217 269/287 |
| 2014/0034714 | A1* | 2/2014 | Gatlin | | B23K 9/0286 228/212 |
| 2014/0103016 | A1* | 4/2014 | Ward | | B23K 37/006 219/121.39 |
| 2014/0197149 | A1* | 7/2014 | Ohta | | B23K 7/00 219/138 |
| 2015/0298238 | A1* | 10/2015 | Van Rensburg | | B23K 9/0017 219/137.31 |

FOREIGN PATENT DOCUMENTS

| | | | | |
|---|---|---|---|---|
| GB | WO 2009122217 A1 | * | 10/2009 | ......... B23K 37/0211 |
| JP | 53115638 A | * | 10/1978 | |
| JP | 55016743 A | * | 2/1980 | |
| JP | 55114494 A | * | 9/1980 | |
| JP | 61030287 A | * | 2/1986 | |
| JP | 61078596 A | * | 4/1986 | |

* cited by examiner

SYSTEM AND METHOD FOR MODULAR PORTABLE WELDING AND SEAM TRACKING

CROSS REFERENCE TO RELATED APPLICATIONS

This patent application is a U.S. National Phase filing of co-pending, commonly owned PCT Application No. PCT/IB2012/002258, filed Nov. 7, 2012, which is based on and claims the benefit of the filing date of U.S. Provisional Application No. 61/563,569, filed Nov. 24, 2011, both which are incorporated herein by reference in their entirely.

TECHNICAL FIELD

The present invention relates to a system and method for portable welding and more particularly to a portable weld seam tracking system used in conjunction with semi- and fully-autonomous welding systems.

RELATED ART

Welding is a well established process for joining metal parts. Many welding operations are performed on-site, e.g. at building sites, installations, etc. A major factor in providing a quality weld relates to the ability of the operator or automated welding system to follow the path of the given joint or 'seam'. Accordingly there is no lack of attempts to solve the problem of accurate seam tracking system while welding, enjoying various degrees of success. Some systems are based on mechanical sensors that run in the seam groove which lead the welding arm mechanically or by means of a servo system along the desired path. Other solutions are based on optical scanning systems that transmit the position of the welding tip relative to the seam and correct the position by means of a servo system. Currently, commercial robotic based systems are available for welding operations in the workshop, often using feedback from the process and capable of accurate positioning and clamping.

It should be emphasized that in most cases tracking does not provide satisfactory results with respect to accuracy and consistency. Therefore in many operations using portable equipment, an operator (in most cases a trained welder) must inspect the entire process and correct the welding tip position in the seam in real time.

Welding in a very tedious, labor intense and complex process. The weld process may require multiple steps. The quality of the weld must be insured to prevent leaks and environmental hazards. Means to simplify the weld process and provide multiple processes in one system is highly desirable.

The environment of the welding area is very unfriendly to delicate devices and instruments; temperatures rise to high level, molten metal globules occasionally are flung in unpredictable directions, and fumes stick to mechanical devices resulting in malfunction.

Welding operations involve high levels of radiation which destroy optical elements of cameras and other optical devices, as well as being dangerous for operators.

The smoke resulting from high temperatures blocks the sight line of cameras and laser based systems, and the fumes are hazardous for human inhalation.

In most cases, due to the fact that thick material is welded in more than one pass, there are tacks of prior passes of weld that are already in the seam. These may cause difficulties in interpreting the image received from optical sensor(s), and also cause difficulties for mechanical sensors because after tacking or root weld of the seam, the weld is no longer smooth enough to provide continuous motion of the mechanical follower.

Following is a list of related prior art (incorporated by reference) that shows the current state of the art: U.S. Pat. Nos. 4,700,045, 5,001,324, 4,806,732, and 4,812,614.

BRIEF SUMMARY

The present invention relates to devices for tracking a welding tip during welding operations by a mechanized platform and/or robotic platform that operates in the field. The platform does not have the ability to chuck the work piece and therefore the accuracy is limited. The platform is designed particularly, but not exclusively for operations on cylindrical bodies such as pipes and tanks.

An element of the invention involves identifying a feature or applying a mark that is parallel to the desired path of welding so that the distance of the welding platform to the seam is controlled.

Using a mark distant from the seam but at a fixed distance therefrom as a guideline avoids issues associated with tracking the actual seam. The mark remains stable and does not change its properties during repeated passes, and the effects of welding such as smoke, radiation and sparkling are kept away from the guide mark.

It is within provision of the invention to provide an automatic modular welding device comprising:
 a support carriage adapted to move relative to said work;
 a processing rig removably connected to said support carriage,
 whereby said processing rig is detachable from said support carriage.

It is further within provision of the invention wherein said processing rig is adapted to perform operations selected from the group consisting of: metal welding, plastic joining, painting, QA analysis, underwater welding, cleaning, wrapping, cutting, measuring, deburring, polishing, sanding, heat treating.

It is further within provision of the invention further comprising sensing means adapted to sense at least one feature upon the work to be welded.

It is further within provision of the invention further wherein said at least one feature is indicative of the path to be welded, said feature being offset from said path by a predetermined amount.

It is further within provision of the invention wherein said carriage is provided with drive means adapted to move said welding rig in response to the relative position between said welding rig and said feature, whereby automatic seam tracking can be accomplished without obstruction of the feature by welding debris.

It is further within provision of the invention wherein said feature is an externally applied mark.

It is further within provision of the invention where the processing rig is used for MIG/TIG welding in the field.

It is further within provision of the invention where the processing rig is used for friction stir welding.

It is further within provision of the invention where the processing rig is used for underwater welding.

It is further within provision of the invention further wherein said processing rig comprises means for creating said feature.

It is further within provision of the invention adapted to perform welds selected from the group consisting of: helical welds; linear welds; circular welds; stairstep welds; sawtooth welds; multipass welds.

It is further within provision of the invention further comprising means for assessing weld quality and reporting means adapted to report upon the weld quality based upon information from said means of assessing weld quality.

It is further within provision of the invention further including attachment means adapted to allow said welding rig to travel about the perimeter of a nonplanar work piece.

It is further within provision of the invention wherein said attachment means is selected from the group consisting of: chain; rope; magnetic means; electromagnetic means; suction means.

It is further within provision of the invention wherein said sensing means is selected from the group consisting of: visual sensing means; optical sensing means; magnetic sensing means; electrostatic sensing means; radioactive sensing means; texture sensing means; olfactory sensing means; chemical sensing means.

It is further within provision of the invention wherein said feature comprises a rigid guide.

It is further within provision of the invention wherein said motoring means comprise a plurality of positioning means adapted to move said welding rig in several directions.

It is further within provision of the invention further providing spatter protection means.

It is further within provision of the invention further providing gas handling means.

It is further within provision of the invention further providing position determination means adapted to determine the position of said welding rig with respect to the work piece.

It is further within provision of the invention further providing environmental sensing means used to adapt the process to the changing condition of the environment.

These, additional, and/or other aspects and/or advantages of the present invention are: set forth in the detailed description which follows; possibly inferable from the detailed description; and/or learnable by practice of the present invention.

BRIEF DESCRIPTION OF THE DRAWINGS

In order to understand the invention and to see how it may be implemented in practice, a plurality of embodiments will now be described, by way of non-limiting example only, with reference to the accompanying drawings, in which.

DETAILED DESCRIPTION

The following description is provided, alongside all chapters of the present invention, so as to enable any person skilled in the art to make use of said invention and sets forth the best modes contemplated by the inventor of carrying out this invention. Various modifications, however, will remain apparent to those skilled in the art, since the generic principles of the present invention have been defined specifically to provide a means and method for providing a system and method for modular welding and welding seam tracking.

In the following detailed description, numerous specific details are set forth in order to provide a thorough understanding of embodiments of the present invention. However, those skilled in the art will understand that such embodiments may be practiced without these specific details. Just as each feature recalls the entirety, so may it yield the remainder? And ultimately when the features manifest, so an entirely new feature be recalled. To justly and entirely describe renditions of each embodiment may not yield full reportage of underlying concepts. Thus we must generally admit that not all embodiments are necessarily described herein, but that the concepts underlying the invention are themselves disclosed.

Reference throughout this specification to "one embodiment" or "an embodiment" means that a particular feature, structure, or characteristic described in connection with the embodiment is included in at least one embodiment of the invention.

The term 'plurality' refers hereinafter to any positive integer (e.g, 1,5, or 10).

The term 'welding' refers hereinafter to any process for joining or separating materials such as metal and plastic, as well as associated acts including cleaning, painting, spraying, vibrating, analyzing, impinging, plating, and irradiating (even without joining or separating metal).

The term 'processing' refers hereinafter to any act involved in joining or separating materials such as metal and plastic as well as associated acts including cleaning, painting, spraying, vibrating, analyzing, impinging, plating, and irradiating.

The term 'feature' refers hereinafter to any identifiable characteristic of a surface, for instance a joint, seam, weld, scribe, mark, indentation, channel, or the like. A feature of two pipes that are adjacent and are to be welded together, for instance, could be the adjacent ends of the pipes, a feature which is particularly relevant in this context since this edge can comprise a potential line along which welding could take place, to join the two pipes.

Figure 1:
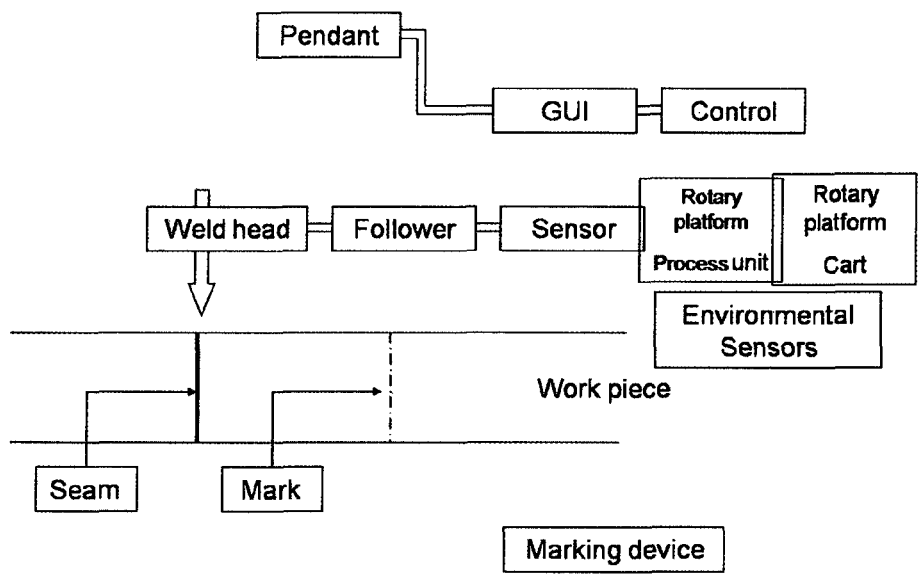
FIG. 1 is a system overview and block diagram of main system components.

FIG. 1 illustrates an exemplary simplified block diagram of a modular welding and tracking system. The system typically but not necessarily includes the following sub-elements:

- A platform capable of rotating around objects such as pipes and cylinders, comprising a cart attached to the cylindrical work piece, and a detachable processing unit that can be easily mounted on the cart.
- A sensor to detect the welding seam and/or special marks on the work piece; or, a reader capable of reading electronic marking on the work piece;
- A follower mechanism (having for instance wheels and motors, capable of moving the welding head and sensors about);

A welding head;
A marking device;
A control system with GUI & pendant.

In a preferred embodiment of the invention, the follower mechanism or 'cart' is built as an integral unit having wheels and motoring means, and is detachable from the more intricate welding, sensing and control means. These latter may be supplied in the form of a detachable cartridge that fits into the cart using a quick release or other reversible connection means.

Figure 2:
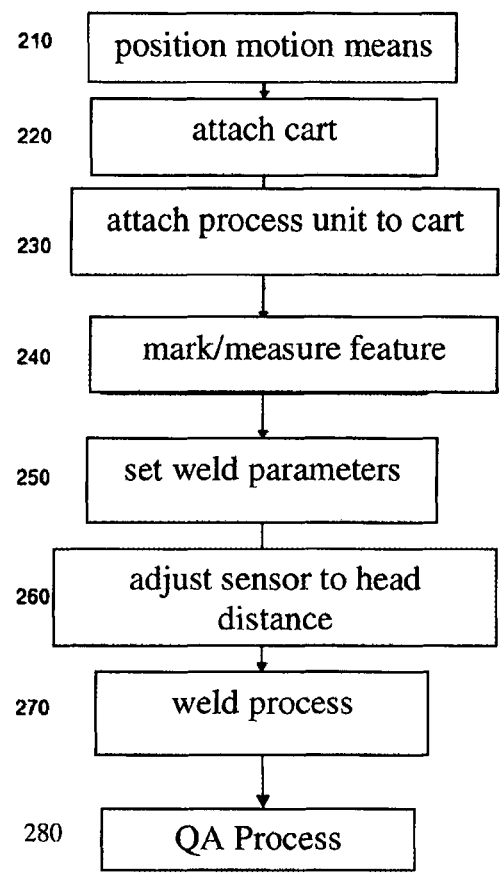
FIG. 2 is a flow chart of system typical operation.

FIG. 2 is a flowchart describing a typical operation flow of the system with the following exemplary steps: {some of the steps are optionally}

Positioning the rotary platform on work piece in the vicinity of the seam (210)
Attaching the cart to the work piece (220)
Attaching the process unit to the cart (230)
Marking a feature for further seam tracking (240)
Setting the weld parameter for the specific weld (250)
Adjusting the sensor to head distance according to the distance between the marking and the seam (260)
Performing the welding process in closed loop mode based on sensory feedback (270)
Performing a QA process based on sensory feedback (280). This process can be either on line with the main process or it can be done after the process, or both, The QA process may comprise ultrasound, visual, optical and other measurements intended to analyze and quantify weld quality in terms of uniformity, weld strength, seam size, weld depth, and other parameters as will be clear to one skilled in the art.

Figure 3A:
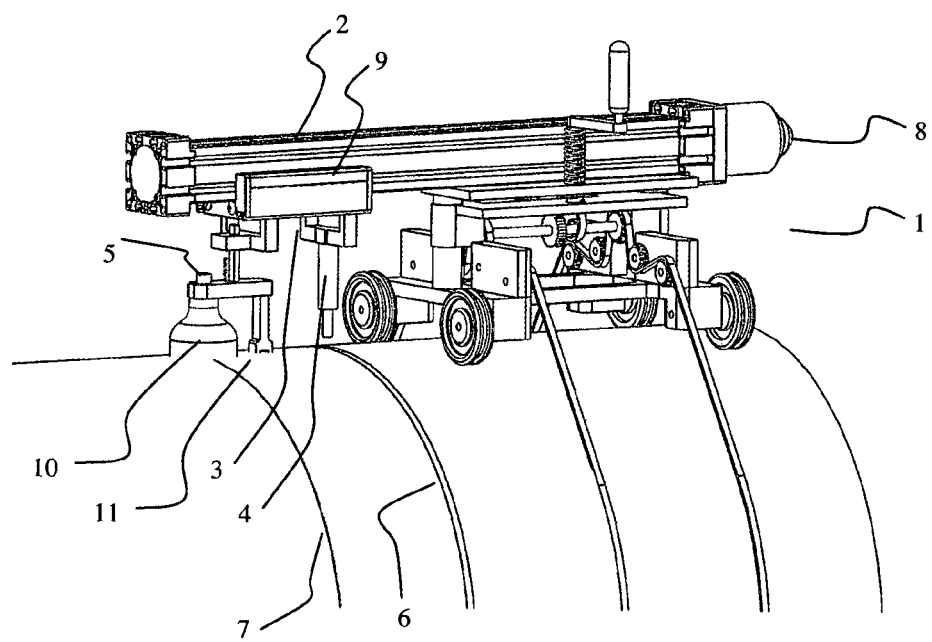
FIGS. 3A,B describe a typical orbital welding system embodiment with a tracking system.
Figure 3B:
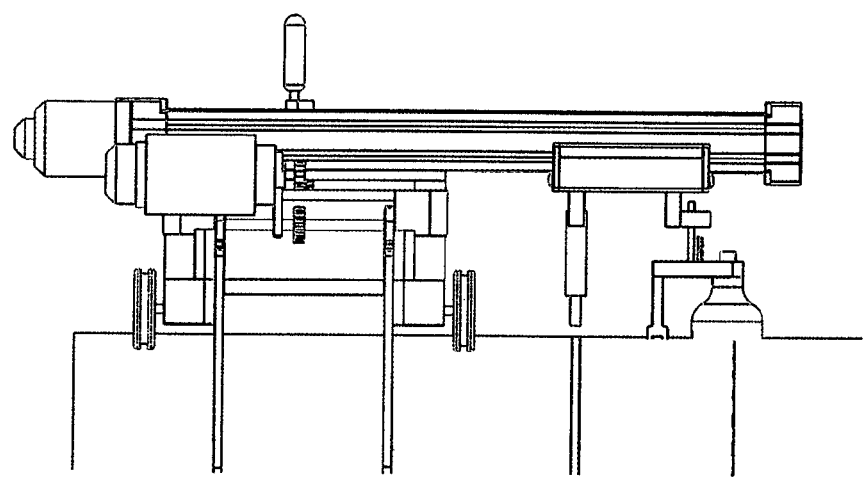

Reference is now made to FIGS. 3a & 3b showing an exemplary orbital welding system with a tracking device in operation.

During a welding process of a joint, a typical rotary platform (1) is attached to the pipe and moves in an orbital path. The platform is equipped with a linear arm (2) that is parallel to the axis of the pipe. The adjustable mechanism (3) enables fine adjustment of the distance between the welding tip (5) and the follower (4).

The mark (6) comprises a reference line that is marked on the pipe prior to the weld operation of the seam (7).

In some embodiments of the present invention the mark is in a form other than a line.

The sensor (4) is used to track the mark and provides a command (for example through a controller) to the arm (2) to adjust the position. The arm is driven by a motor (8) that drives the moving slide (9).

The unit may be fitted with height adjustment and control (11).

In some embodiments of the present invention, an additional head is added to the platform (e.g. near the welding head) that includes instruments such as a camera/ultrasound/laser head for position and quality inspection. In some embodiment of the present invention these heads are modular and interchangeable (i.e. One processing head and one QA head)

A shielding device (10) provides protection to the weld tip and therefore makes possible the use of a shielding gas as known in MIG and TIG welding.

Figure 4:
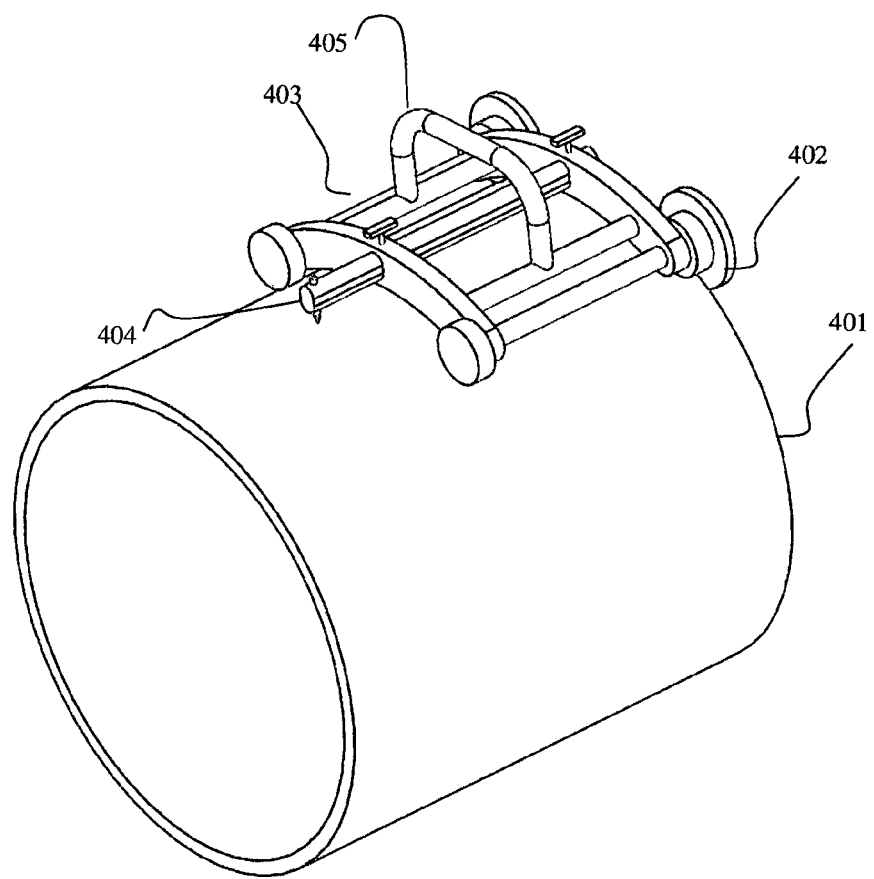
FIG. 4 is a typical hand held marking and or measurement device.

Reference is now made to FIG. 4 showing an exemplary hand held marking device that is used for pipes that require marking in the field.

The marking unit is fitted with an edge following wheel (402) that is attached to the work piece end (401) and to the marking cart (403). The cart (403) is hand held by handle (405). An adjustable arm with a marking tip (404) is used for marking. The arm can be adjusted and locked by using screw (405)

The entire manual marking device is designed for smooth and consistent motion and that can be easily performed by the operator.

Another exemplary method to mark the welding seam can include a motorized marking device. Other options include the addition of a marking device to the rotary platform.

For work pieces of large dimensions, several marking devices can be used in parallel (as long as the marking distance is adjusted similarly on the devices).

A marking device can also be used for non cylindrical parts. For example a marking device can be design to follow a groove and/or a wall and/or a step pattern.

In some embodiments of the present invention a marking device can be fitted with an electronic reader whereby the read information can be used for following the seam or joint.

In some embodiments of the present invention a marking device can be part of a cleaning device that prepares the welding area.

Figure 5A:
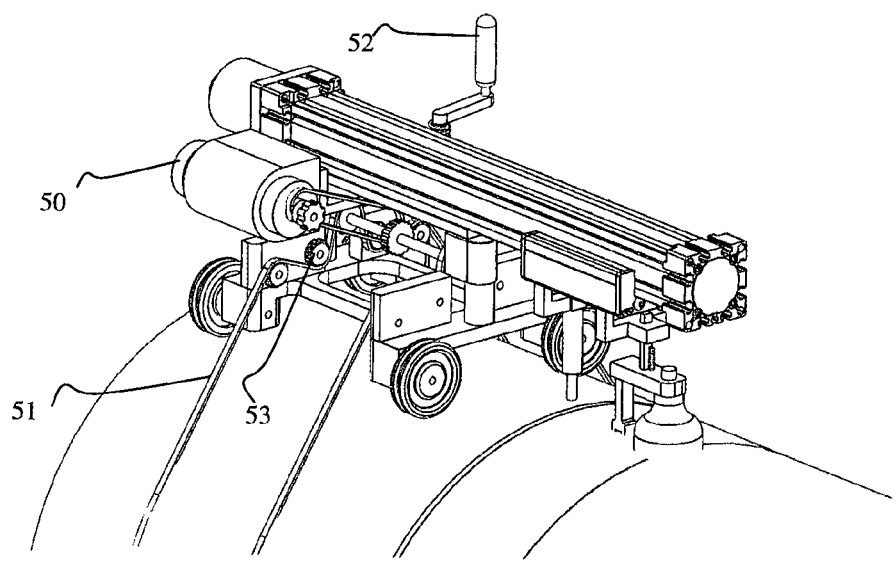
FIGS. 5A,B are an embodiment of a rotary platform mechanism.
Figure 5B:
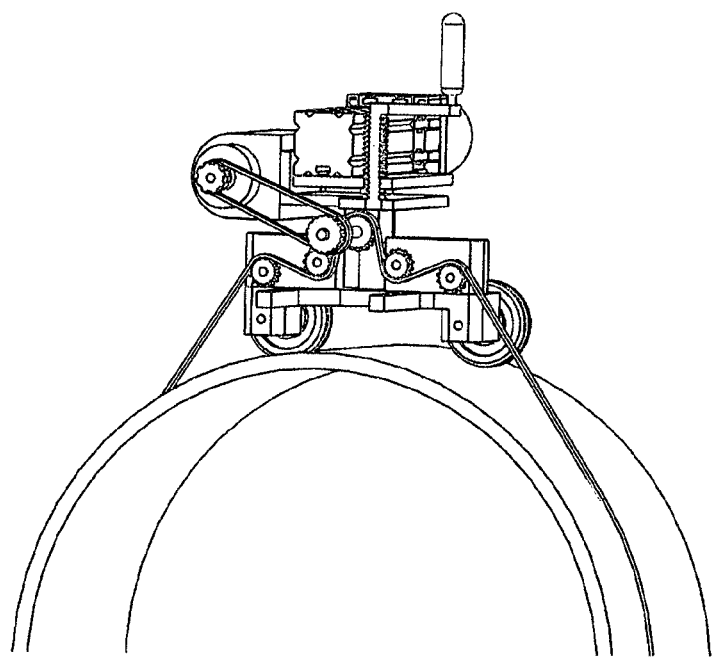

Reference is now made to FIG. 5 showing an example mechanism of a rotary platform suitable for welding pipes, tubes, and other objects of cylindrical symmetry.

The platform is attached to the pipe using a chain (51) that can be adjusted and tightened to the pipe circumference by means of a crank (52) that pulls a tightening sprocket (53). The chain and motion elements are optionally embedded in a modular cart which mates reversibly with the rest of the welding platform. In this way the device is rendered modular insofar as the movement means comprising cart, wheels, motoring means and the like are separable from the welding and sensing means.

The rotary platform rotates around the pipe by means of motor (50) that is linked to the chain. The motor (50) can also rotate the rotary platform wheels to assist and smooth the rotational motion of the welding platform as it rotates around the pipe in circular or helical fashion.

In some embodiments of the present invention, the chain (51) can be unlinked to allow easy connection of the unit to the pipe by wrapping the chain around the pipe. In some embodiments of the present invention a belt or a wire is used instead of (or in conjunction with) the chain.

Figure 6A:
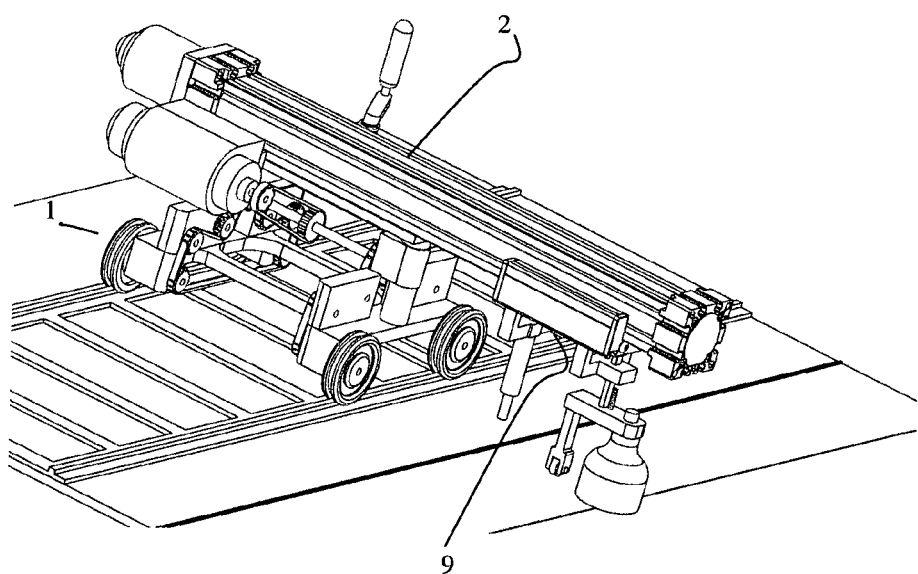
FIGS. 6A,B are an exemplary drawing of a flat mechanism.
Figure 6B:
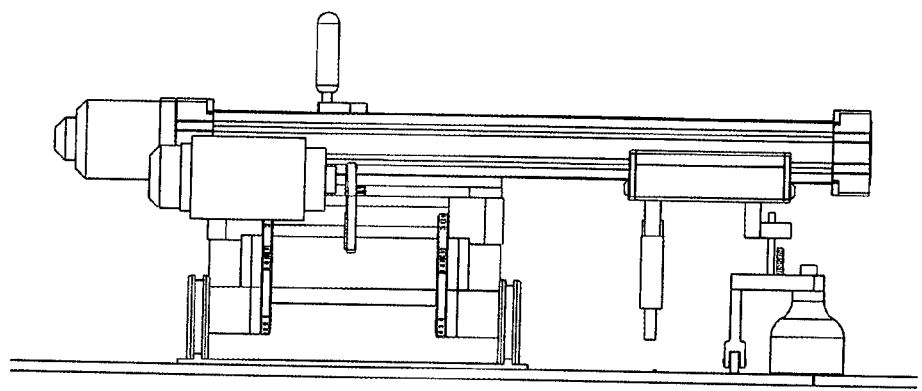

A similar system for flat plates or various other largely planar surfaces is shown in FIGS. 6A,B. The cart (1) is separate from the rest of the assembly which includes an arm (2) upon which the welding apparatus may travel upon a sliding member (9). In this way the device is rendered modular in the sense that the cart is easily separable from the welding and control elements. Thus the cart and/or welding apparatus may be replaced easily for repair, use of different welding system, use of different motoring means, use of different feedback means, and the like. For example a welding apparatus suitable for underwater welding can be used on the same cart used for open air welding by simply replacing the welding apparatus.

Figure 7A:
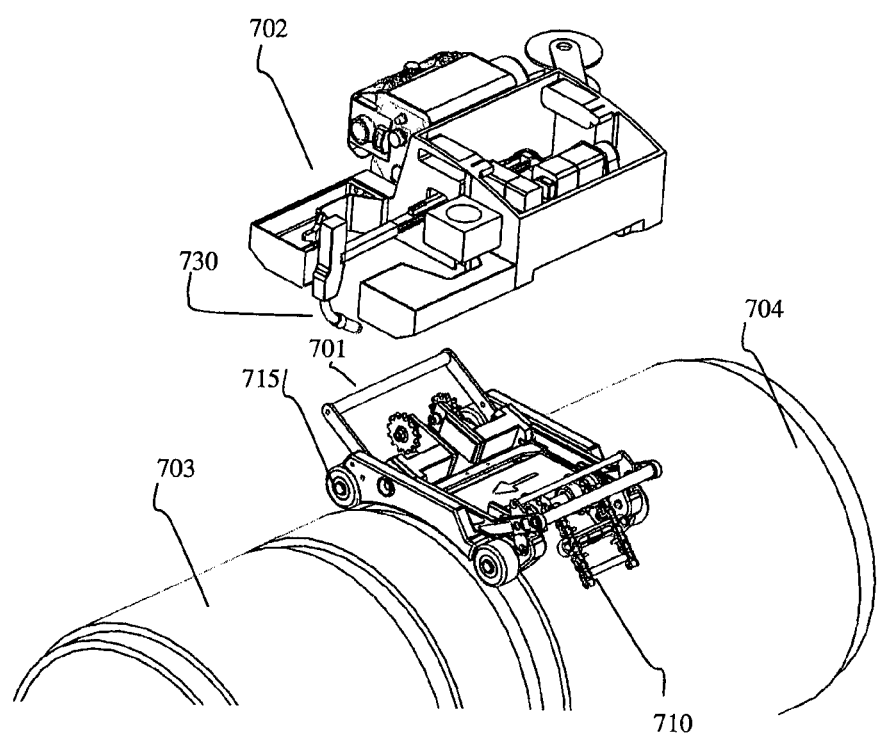
FIGS. 7A,B,C,D and E is an exemplary drawing of a modular pipe welding system.

FIG. 7A shows a possible embodiment of the system in context of welding two pipe sections (703 & 704). The welding cart 701 travels by means of a chain system 710 as will be understood by one skilled in the art. The cart has motoring means 715 allowing it to travel around the circumference of the pipe to be welded. A welding apparatus 702 is designed to removably mate with the cart 701 by means of quick release connection or similar reversible connection means. The welding apparatus 702 contains means for positioning a welding device 730 by moving the welding device in a direction parallel to the pipe axis, perpendicular to the cart direction of movement.

Figure 7B:
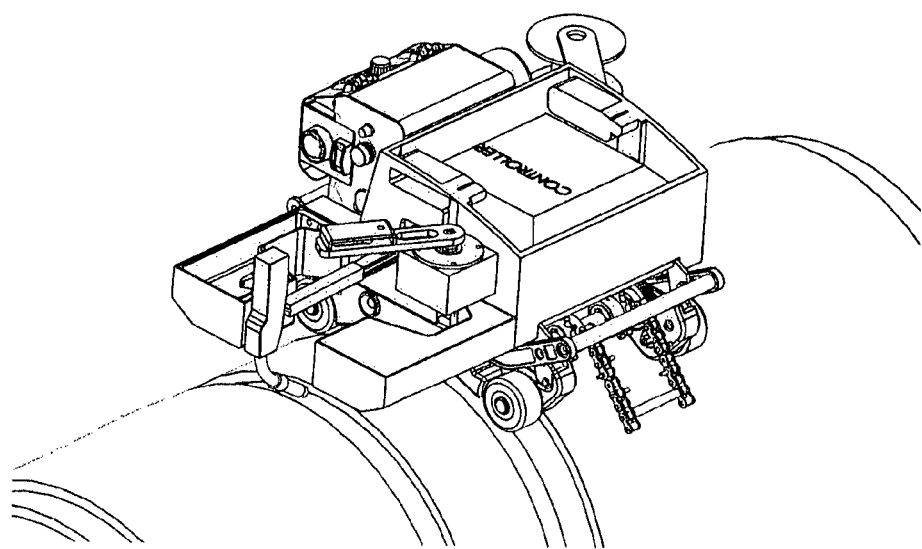

FIG. 7B shows the system after connecting the welding apparatus to the cart.

Figure 7C:
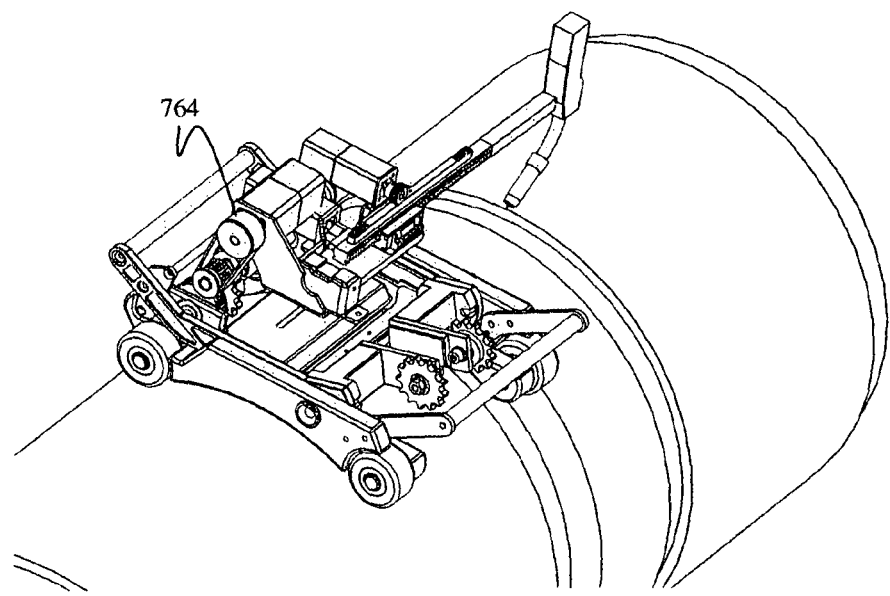
Figure 7D:
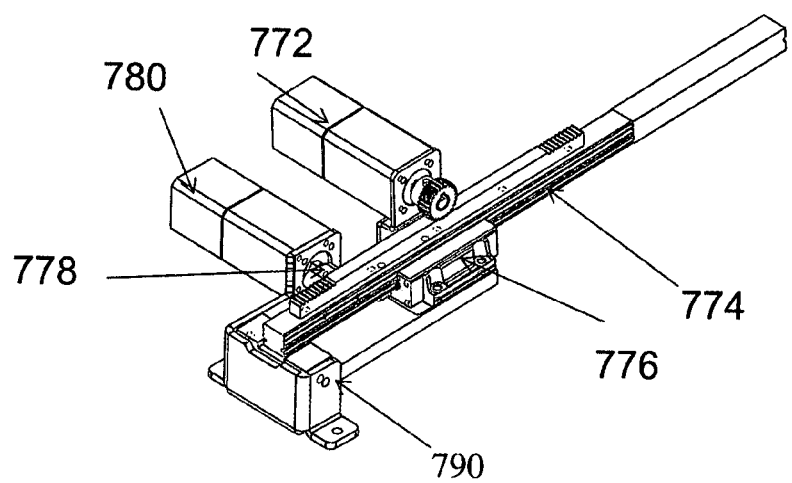

FIGS. 7C,D shows a top view of the welding system.

Figure 7E:
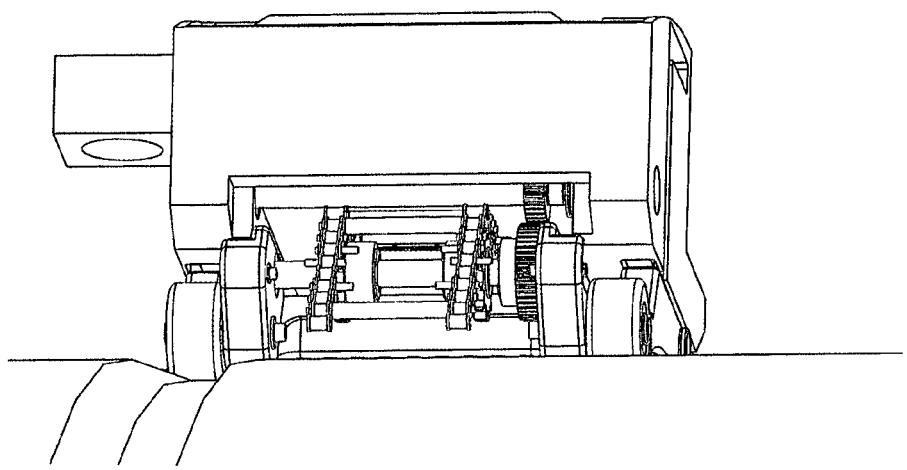

FIG. 7E shows a side view of the welding positioning means by which the welding apparatus may be moved in the direction parallel to the pipe axis; a set of motors 780, 772 are supplied to move a rail 774 held by a linear bearing 776. Through this means the system can control two axes of the welding apparatus position radial and axial the cart controls the azimuthal position of the entire device while the welding apparatus controls the position of the welding head along the pipe axis and radially. The two motions of the welding apparatus can compensate for both lateral and vertical shift of the seam.

FIG. 7F shows an isometric view of the system with welding apparatus connected to cart. Here one can see various transmission means of the motoring system.

Figure 8A:
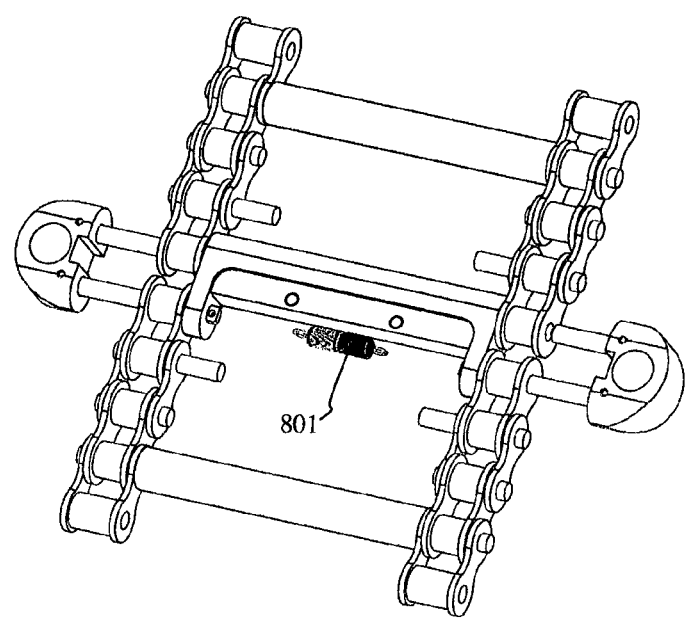
FIG. 8 depicts one embodiment of a chain mechanism adapted to allow the welding platform to travel around the circumference of a pipe.
Figure 8B:
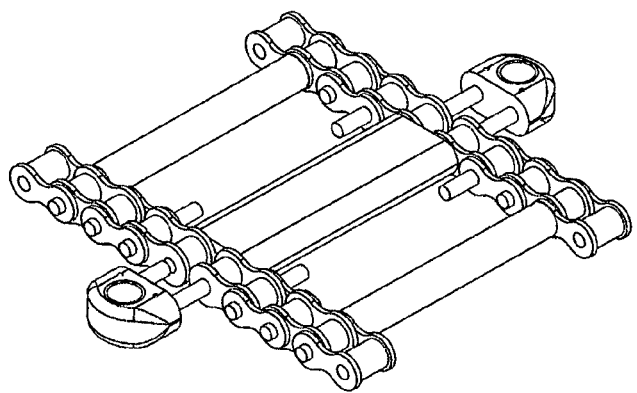
Figure 9:
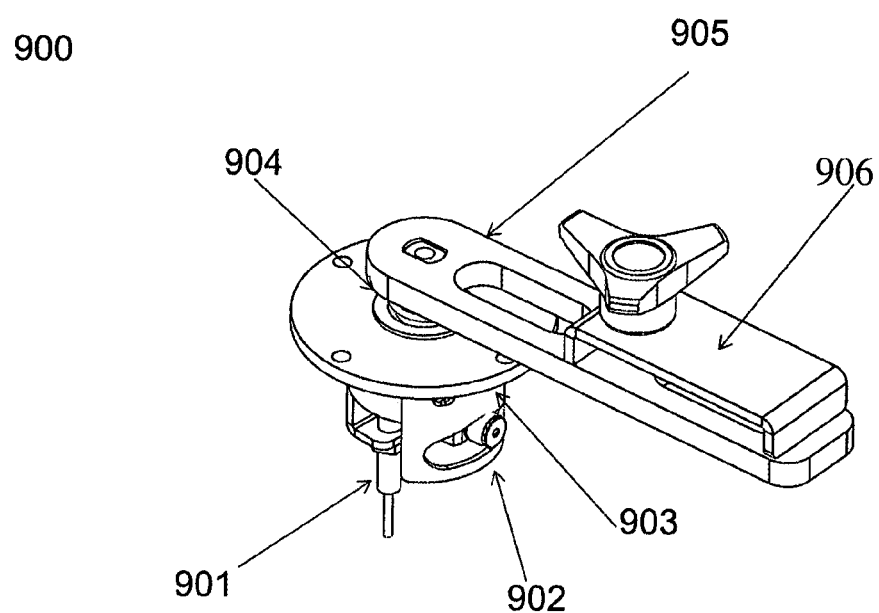
FIG. 9 shows a cable tension protection mechanism for the carriage and processing unit.

FIG. 8 shows links of the chain that can be removed allowing the cart to be removed or attached to a pipe. In some embodiments a spring is used (801) to retain the two chain parts in place and provide easy means for attachment and dismantling of the chain links. The usage of a quick chain release allows easy usage of system with various pipe diameters FIG. 9 shows a cable tension protection mechanism. A sensor 901 detects the motion of a cam follower 902 when it is away by a given amount from the center position. The cam follower is installed in housing 903. A spring 904 provides the resistive force to the cable tension thru arm 905 and bracket 906. In some embodiment of the present invention the spring 904 can be adjusted. The positioning means may comprises two joints as shown here, or may comprise further joints to allow for increased degrees of freedom for the welding tip. Thus more intricate welds than those required for simple pipe seam welding jobs may be contemplated using the current device.

Figure 10A:
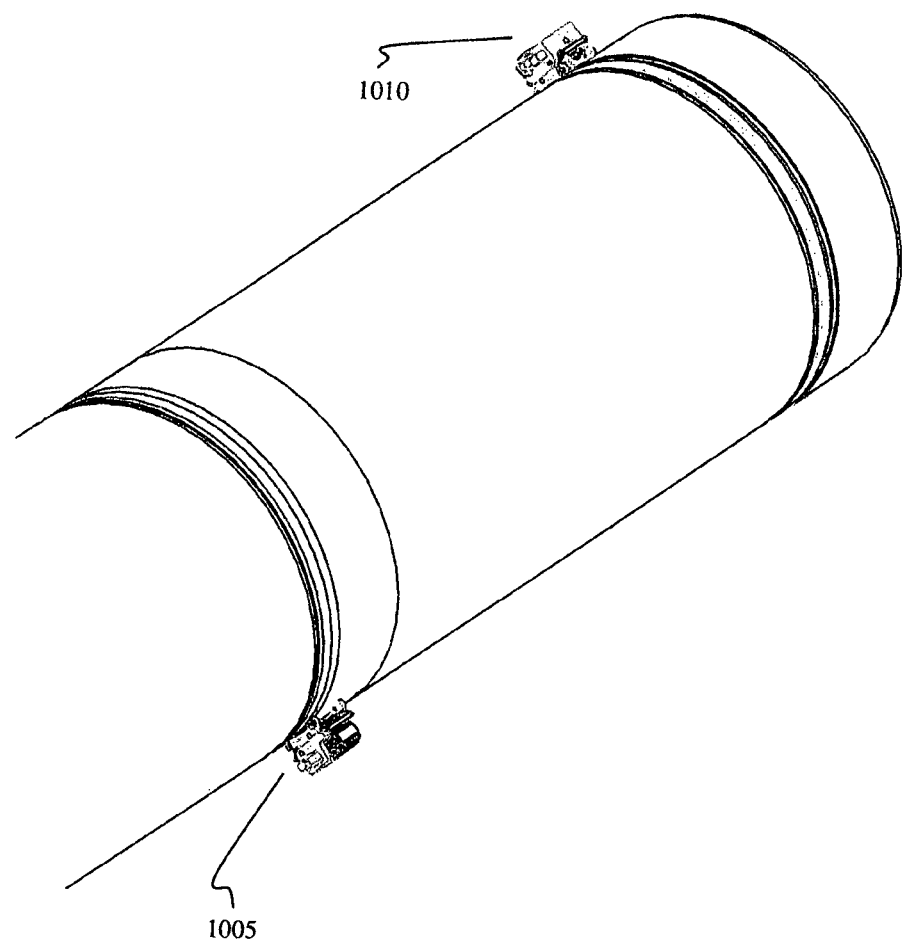
FIG. 10 shows several of the welding modular platforms of the invention in the context of welding around the circumference of a large diameter pipe.
Figure 10B:
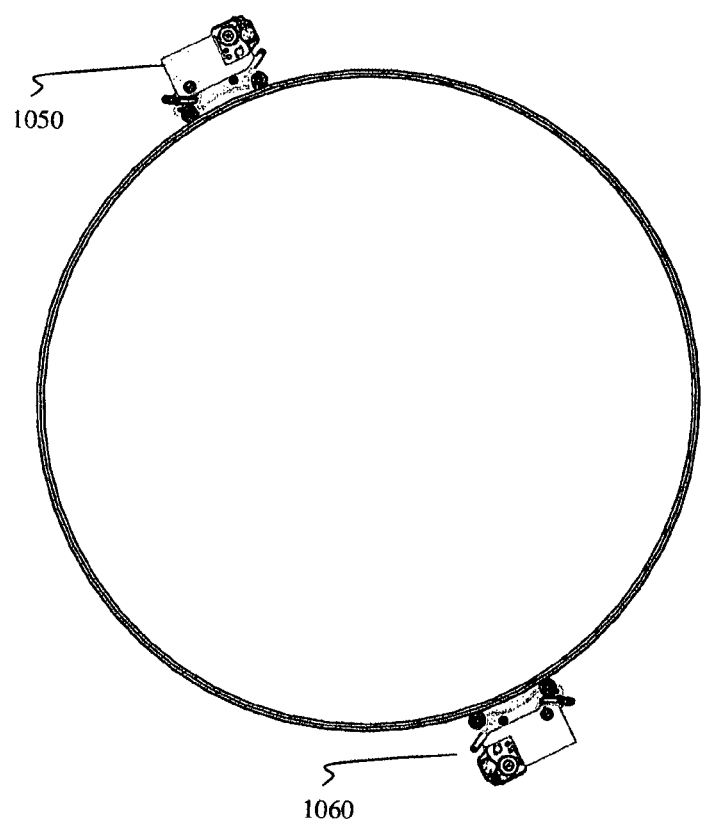

Reference is now made to FIG. 10 showing optional work done with multiple robotic and or processing units. FIG. 10a shows two units 1005 and 1010 of the invention working on 2 segments of a pipe 1001. The welding units comprise a cart section having motoring means, and a processing section that mates with and rides on the cart section. The processing section has welding means, or in other embodiments may be fitted with a pre-welding cleaning system, a post-welding cleaning system, a painting system, a QA system with ultrasound, video, or the like, or other related process capabilities relevant to the overall method of joining materials such as metallic or plastic pieces; as will be clear to one skilled in the art. FIG. 10b shows unit 1050 and 1060 working in parallel on the same pipe section. In some embodiments of the present invention more than 2 units may work in parallel, and furthermore each cart may employ multiple processing units so as to provide optimal performance in terms of speed, weld quality, safety or the like. In some embodiments of the present invention one processing unit may be used for QA while the other unit is used for processing. As clear from the description and drawings the same cart can serve multiple processing units, thus reducing the set up time and change over time of the various processes. This is due to the fact that the cart will not have to be removed and replaced; it is already adapted and ready to travel over the work surface to reach the relevant working areas such as seams between pipes or plates. Thus to switch from precleaning to welding to postcleaning to painting requires only swapping out the process module several times upon the same cart module.

Exemplary Structures of Tracking System

The system is fitted with a tracking sub system comprising, in certain embodiments, various elements and options such as use for on and or of off seam tracking, following a feature embedded in the pipe, and the like.

The feature to be followed in the pipe can be anything the welding platform can detect and follow, including but not limited to:

A groove;
A cut;
A mark;
An indentation;
Magnetic marking;
Optical marking;
A mark which is part of the pipe manufacturing process, for example the pipe weld seam;
Combinations of the above;

Furthermore, it is within provision of the invention that the welding platform be supplied with means to record the position of the seam by first measuring the seam relative to the rotary platform storing the information in a controller and then using it while welding. Possibly some marks along the seam may be used to adjust position for occasional referencing and or homing.

The welding platform can in some embodiments use marked features with an appropriate sensor(s) and servo loop to provide the necessary position of the welding tip relative to the seam.

In some embodiments of the present invention a dual system is used where a marked location is used for initial tracking and is complemented by a secondary system, for example by use of current feedback to allow for position measurement from the tip. The current as will be clear to one skilled in the art is dependent upon welding electrode position from the work, and can hence be used as part of a feedback loop as described. Another example within provision of the invention would comprise a vision or laser (or other optical means) system that images the seam, for example including the area in front of the rotary platform to allow for accurate movement of the welding platform with respect thereto.

In some embodiments of the present invention the seam tracking system can use stored data from previous passes over the seam to correct the current location of the tip.

How to Mark

Marking of the work (such as the seam or a line parallel to the seam) can be done in various locations and by a selection of marking means.

In some production processes, marking is made relative to the pipe end and can be done after the final cutting or as part of the cutting production process.

Alternatively the marking may be done as a separate operation, e.g. using a marking tool such as an engraving system. Flat and curved work may both be served by either of these means, for example using a marking tool while forming the pipe end.

The marking can also be performed in the field, by a device operator or other personnel. A separate marking tool can be fitted on the pipe, and can be done manually or automatically. Marking can also be accomplished in the form of an actual paint/dye mark (e.g with a marking tip). Marking can also be done with a cutting tool (which may be portable) to create a groove or score; possibly, the groove can be filled with a dye.

In some embodiments of the present invention an electronic marking device can be used, for example by marking the location with a magnetic field.

Shielding the Welding Environment

Since the tracking mechanism is positioned away from the welded area it is possible to provide good environmental protection for the seam area, allowing effective shielding gas dispensing, and preventing spattering and radiation.

Various methods of shielding are proposed here by way of example:

Providing a rubber/silicon cover on the weld area;
Providing a brush type cover to the weld area;
Using a bellow element for shielding;
Using multi-finger strip elements.

The shielding element also provides a simple means to evacuate the process gas (e.g by using vacuum).

Validation Consideration

After marking, an operator can review the mark manually/visually.

The marking system can be fitted with a mechanism to identify pipes with irregular cuts, e.g by means of identifying deviations that are too big to be used for welding, and can generate warnings.

Quality Assurance QA

In some embodiments of the present invention the rotary platform is used to provide a QA report after weld completion that can be used to validate weld integrity.

In some embodiments of the present invention on process QA (online) is performed by measuring various parameter during the weld process.

In some embodiment of the present invention a separate QA cycle can be performed using the welding platform or the cart with a dedicated QA processing head. Various sensors can be used in addition to or instead of the in-process parameter, such as a vision system, Laser system, IR system other optical system, X-ray systems, ultrasound systems, and the like.

Additional features within provision of the invention include:

Adjustment of the distance of mark from the weld point and/or edge;
Communicate directly to welding/cutting system with Bluetooth, Wifi, etc.;
Measure instead of marking by use of memory elements;
Mark only the start point and deliver "electronic marking (e.g. memory) to the weld system;
The marking/measuring system is fitted more than one position measurement, e.g. one for the azimuthal movement and one for distance along the pipe axis;
The cart having movement means (wheels, motors or the like) may be separate and detachable from the welding rig (or 'process module', a name more indicative of the fact that operations other than welding, such as QA, may be contemplated with use of the device), allowing the system to be operated in modular fashion. For example several different cart designs may be provided, some able to navigate planar structures and others adapted for cylindrical structures, and still others adapted for other types of movement, yet all may mate with the same welding apparatus and or same QA apparatus. Similarly multiple welding apparatii may be provided all being able to mate modularly with the various carts, for example welding devices adapted for thick material, for thin material, for different material types, and/or for different welding techniques such as e-beam welding, laser welding, friction stir welding and so forth. Optionally joining apparatus may be provided for plastic or non metal joining processes with dedicated processing means.

The cart may be moved manually to locate and mark seam;
The seam may be marked and then tracked;
The sensor may be located ahead of the seam, on the cart;
The sensor may be located on a separate cart;

Modularity:

a. Two carts may share the same motion means;
b. Multiple carts may work simultaneously on different pipe sections;
c. Multiple different welding carts may be provided having different capabilities in terms of navigation, motoring, stability, etc. All may be designed to mate with a given welding apparatus. Similarly a variety of welding apparatii may be provided that can all mate with the various carts by means of a single unified interlock mechanism as will be obvious to one skilled in the art. By such means various welding techniques may be made available using the same modular system.
d. Various process modules can share the same cart and can be used interchangeably based on the application and needs; for example the process module which rides on the cart may comprise:
  i. Welding apparatus
  ii. QA apparatus
  iii. Polishing apparatus
  iv. Cleaning apparatus
  v. Wrapping apparatus (e.g. for pipe shielding material)
  vi. Cutting apparatus
  vii. Painting apparatus
  viii. Heating apparatus
  ix. Forming apparatus
  x. Plating apparatus
  xi. Plasma spraying apparatus It is within provision of the invention that sensors for environmental conditions be employed to inform and control the welding (and/or other process) parameters. For example temperature, wind speed, smoke concentration, vibration levels, CO2 concentration, oxygen levels, relative humidity, orientation, heading, and the like may be measured and used to change such process parameters as welding current/voltage, gas pressure, gas flux, welding speed, welding technique, and the like.

Although selected embodiments of the present invention have been shown and described, it is to be understood the present invention is not limited to the described embodiments. Instead, it is to be appreciated that changes may be made to these embodiments without departing from the principles and spirit of the invention, the scope of which is defined by the claims and the equivalents thereof.

What is claimed is:

1. An automatic modular welding device comprising:
a support carriage adapted to move along at least one flexible track relative to a work piece, the at least one flexible track being disposed directly on the surface of the work piece; and
a welding head connected to a welding rig,
the welding rig removably connected to said support carriage, wherein a sensor provides a position of the welding head relative to at least one feature on the work piece, and wherein the support carriage lifts the at least one flexible track off the work piece as the support carriage moves relative to the work piece, wherein the at least one feature is indicative of the path to be welded, said feature being offset from a welding location by a predetermined amount, and wherein said carriage is provided with a drive to move said welding rig in response to a relative position between said welding rig and said feature, and wherein automatic seam tracking is accomplished without obstruction of the at least one feature by welding debris, and wherein said welding rig comprises a marking device for creating said feature.

2. The device of claim 1 wherein said feature is an externally applied mark detected by the sensor.

3. The device of claim 1 wherein the welding rig assesses weld quality and provides feedback on the weld quality based upon information from said assessment.

4. The device of claim 1 further including attachment means adapted to allow said welding rig to travel along the track about the perimeter of a nonplanar work piece.

5. The device of claim 1 wherein said feature comprises a rigid guide.

6. The device of claim 1 wherein said drive comprises a plurality of positioning means adapted to move said welding rig in several directions.

7. The device of claim 1 further comprising:
position determination means adapted to determine a position of said welding rig with respect to the work piece.

8. The device of claim 1 further comprising:
environmental sensing means to adapt a welding process to a changing condition of an environment.

9. The device of claim 1, wherein at least a portion of the track is wound through a series of rollers or gears provided in the support carriage.

10. An automatic modular welding device comprising:
a support carriage adapted to move relative to a work piece; and
a welding rig removably connected to said support carriage, wherein the at least one feature is indicative of the path to be welded, said feature being offset from a welding location by a predetermined amount, and wherein said carriage is provided with a drive to move said welding rig in response to a relative position between said welding rig and said feature, wherein automatic seam tracking is accomplished without obstruction of the at least one feature by welding debris, and said welding rig comprises a marking device for creating said feature.

* * * * *